April 17, 1934.  H. L. SPENCE  1,955,393
LUBRICATING MEANS FOR WEDGING SURFACES OF FRICTION DRAFT GEARS
Filed May 6, 1930
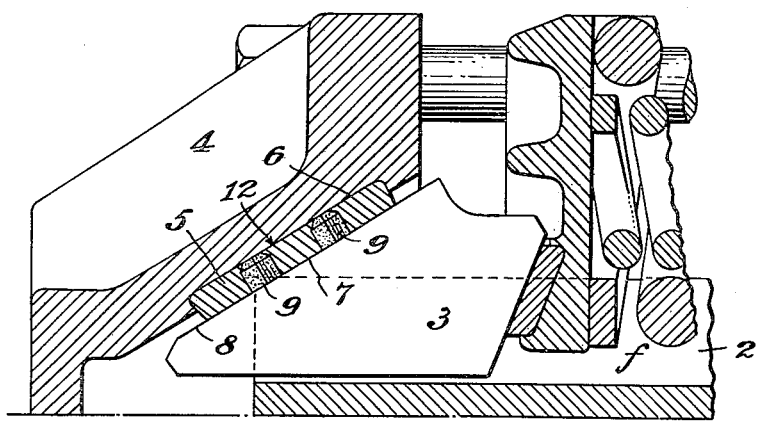
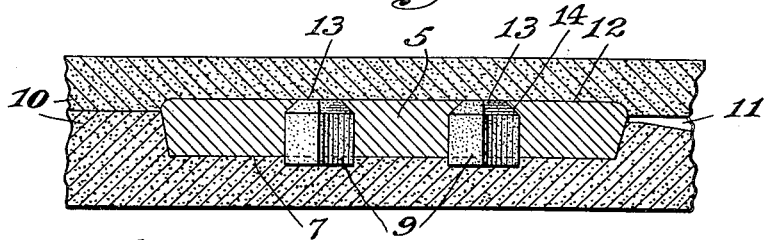
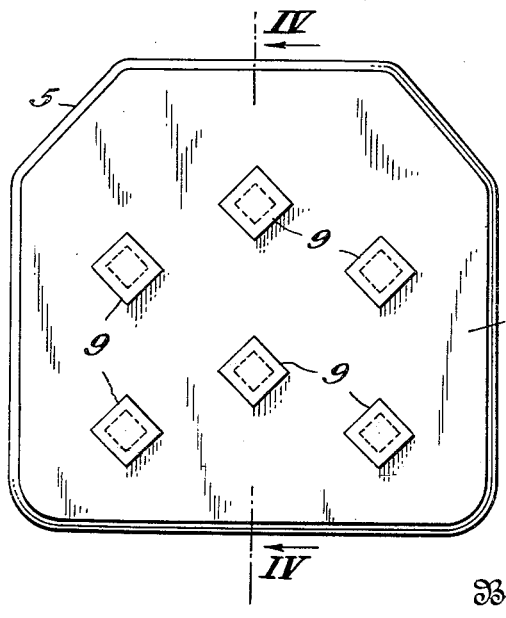
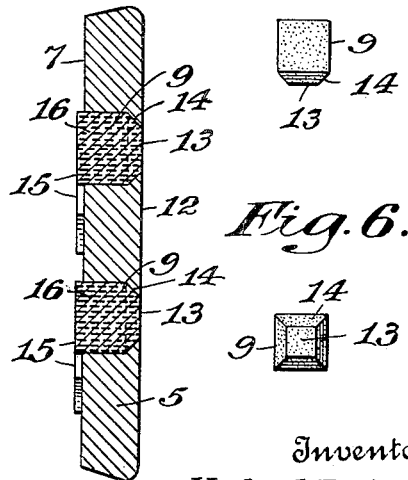
Inventor:
Hubert L. Spence
By his Attorney
Clarence D. Kerr Patented Apr. 17, 1934

1,955,393

UNITED STATES PATENT OFFICE 1,955,393

LUBRICATING MEANS FOR WEDGING SURFACES OF FRICTION DRAFT GEARS

Hubert L. Spence, East Cleveland, Ohio, assignor to National Malleable and Steel Castings Company, Cleveland, Ohio Application May 6, 1930, Serial No. 450,101

6 Claims. (Cl. 213—36)

This invention relates to friction draft gear and particularly to the lubrication of the wedging surfaces thereof. The failure of the wedging member to release from the friction shoes as the pressure abates has been a prolific cause of trouble in friction draft gears. It has been found that if the engaging surfaces of the wedge and shoes are provided with a substantial quantity of graphite or similar material, this sticking, as well as the creeping of the parts under draft, may be avoided and release of the parts assured. I have provided an improved lubricating means for draft gear wedging surfaces, which means possesses various advantageous features as hereinafter more particularly described and claimed.

In the accompanying drawing:

Fig. 1 is a partial longitudinal section showing the application of my invention to a draft gear.

Fig. 2 is a section of part of a mold employed for casting lubricating elements in one of the wedging surfaces of a draft gear.

Fig. 3 is a plan view showing a completed wedging surface with the lubricating elements cast therein.

Fig. 4 is a section on line IV—IV of Fig. 3.

Fig. 5 is a detail view in side elevation of one of the lubricating elements, and Fig. 6 is a detail end view thereof.

Referring more specifically to the drawing in which I have shown my invention applied to shock absorbing mechanism of the included friction type (although obviously the invention is applicable to any type of gear in which a wedge is used to force a friction shoe or segment against another friction member) 2 indicates the central friction member having friction shoes or members 3 held against the friction faces $f$ of the central friction member by the wedge or follower 4. The face of the follower which engages the shoe is, in this case, provided with a soft metal pad 5, preferably of brass or similar metal, which is shown seated in a recess 6 of the wedge, the face 7 of the pad 5 bearing on the wedging face 8 of a friction shoe.

One way in which my invention may be carried out is to form or mold graphite, preferably of the grade known as natural flake graphite, into elements designated 9. These elements are set in a mold 10, such as is shown in Fig. 2, into which the wedging surface pad 5 is to be cast. The molten metal is then poured into the mold through the gate 11 and is thus cast around the preformed elements 9. The length of the elements is made slightly greater than the thickness of the pad 5, so that they will project a short distance through and beyond the working face 7 of the pad; while the inner end 13 of each of said elements, or a portion of said end, extends at least to the plane of the back surface 12 of said pad. The elements 9 are beveled adjacent their inner ends, as shown at 14. By positioning the elements 9 in the mold so that their inner ends 13, or portions thereof, are flush with the rear surface of the pad 5 when cast, or in other words, so that said inner ends or portions thereof contact with the sand in the upper section of the mold, as shown, provision is made for the ready release of any gas or steam which may be given off by said inserts during the molding operation. In this way gas and steam may readily escape from said inserts during molding and may be absorbed by the sand of the mold without the necessity of passing through the molten metal forming the pad, whereby the formation of gas pockets or blow holes in the pad is avoided. At the same time, by providing the inserts 9 with beveled portions 14, said inserts are firmly anchored in the pad so that when the latter is positioned in the recess 6 provided therefor in the follower element 4, and pressure is applied against the working face 7 of the pad by the shoes 3, the inner ends of the elements 9 will be prevented from moving inwardly into any spaces which may exist between the bottom of the recess 6 and the inner ends of said elements; with the result that the squeezing of the outwardly projecting ends 15 of the elements 9 into a film of graphite over the face 7 of the pad is insured.

In short, through my invention provision is made for the avoidance of the formation of pockets or blow holes in the pad 5 during the molding operation, while at the same time forcing of the inserts beyond the inner surface 12 of the pad 5 in response to the pressure of the shoes 3 is prevented, and the formation of a film of lubricant over the working face 7 of said pad is assured.

While, in the example shown, the inserts or elements 9 are shown beveled on four sides, the desired results may, of course, be obtained in other ways. For example, each insert might be beveled on only two sides, or the entire insert might be tapered. So long as the inner face of the insert is of smaller area than its working face, the insert or element 9 will not be readily pushed through the pad 5 when assembled in the gear.

It is desirable that the inserts or elements 9 be so formed from natural flake graphite that the grain thereof extends perpendicularly to the working face 7 of the pad 5. I find that inserts made of flake graphite have a definite grain structure similar to the grain of wood, and that these inserts split much more easily with the grain than across the grain. When the inserts 9 are formed so that their grain extends perpendicularly or at a substantial angle to the surface 7 of the pad, the danger of breakage of the inserts is very substantially lessened. In Figure 4, the grain of the elements 9 is indicated at 16, although it will be understood that the grain there shown is on a substantially magnified scale for purposes of clearness, the actual grain of the inserts being much smaller than that appearing in said figure.

The terms and expressions which I have employed are used as terms of description and not of limitation, and I have no intention, in the use of such terms and expressions, of excluding any mechanical equivalents of the features shown and described or portions thereof, but recognize that various structural modifications are possible within the scope of the invention claimed.

What I claim is:

1. A draft gear comprising, a metallic wedge member having elements of graphite projecting beyond the working surface thereof, each of said elements having a grain structure the grain of which extends perpendicularly to said working surface.

2. In combination, a draft gear wedge member having recesses therethrough, elements formed of particles of lubricating material and positioned in said recesses, said elements extending beyond one face of said member, and being formed of material having its grain extending substantially perpendicular to the face of said member for increasing the strength of the projecting portions of said elements and facilitating the formation of a coherent film of lubricating material upon the face of said member when said projecting portions are subjected to pressure.

3. A composite bearing member comprising preformed lubricating elements and a casting about said lubricating elements and interlocked therewith to prevent movement of said elements relative to said body in one direction, said elements extending at one end to one face of said body and at their other ends projecting beyond the opposite face of said body, said elements being formed of particles of lubricating material having its grain extending substantially perpendicular to the ends thereof, increasing the strength of the portions of said elements projecting beyond said body and facilitating the formation of a coherent film of lubricating material upon the face of said body when said projecting portions are subjected to pressure.

4. A bearing member having recesses therein, elements made of lubricating material mounted in said recesses and extending from within the body of said member to points beyond the working face thereof, said elements being formed of flake lubricating material arranged with the plane of said flakes perpendicular to the working face of said member and means for preventing movement of said elements beyond the other face of said member.

5. A lubricating element for a bearing member having a working face directly opposite the surface to be lubricated, said element comprising flake graphite arranged with the planes of its flakes substantially perpendicular to the working face of said element.

6. As an article of manufacture, a draft gear friction member including a casting having a block of flake lubricating material operatively embodied therein, said block having been formed prior to being embodied in said casting said graphite having a grain structure the grain of which extends substantially at right angles to the work surface of the block.

HUBERT L. SPENCE.